US011958538B2

(12) United States Patent
Morgan et al.

(10) Patent No.: US 11,958,538 B2
(45) Date of Patent: Apr. 16, 2024

(54) MUD FLAP WITH ADAPTABLE MOUNTING SECTION

(71) Applicants: COMPAGNIE GENERALE DES ETABLISSMENTS MICHELIN, Clermont-Ferrand (FR); Justin Morgan, Anderson, SC (US); Parker Baxter, Greenville, SC (US); Calvin Rhett Bradley, Greenville, SC (US)

(72) Inventors: Justin Morgan, Anderson, SC (US); Parker Baxter, Greenville, SC (US); Calvin Rhett Bradley, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 627 days.

(21) Appl. No.: 16/651,993

(22) PCT Filed: Sep. 29, 2017

(86) PCT No.: PCT/US2017/054520
§ 371 (c)(1),
(2) Date: Mar. 27, 2020

(87) PCT Pub. No.: WO2019/066942
PCT Pub. Date: Apr. 4, 2019

(65) Prior Publication Data
US 2020/0262487 A1    Aug. 20, 2020

(51) Int. Cl.
*B62D 25/18* (2006.01)
(52) U.S. Cl.
CPC ......... *B62D 25/182* (2013.01); *B62D 25/188* (2013.01)

(58) Field of Classification Search
CPC .. B62D 25/188; B62D 25/163; B62D 25/182; B62D 25/168
See application file for complete search history.

(56) References Cited

U.S. PATENT DOCUMENTS 3,337,238 A * 8/1967 Weasel, Jr. ........... B62D 25/188
280/851
3,549,171 A * 12/1970 Manuel ................ B62D 25/188
280/851

(Continued)

FOREIGN PATENT DOCUMENTS

| FR | 1575907 A | 7/1969 |
| GB | 2300396 A | 11/1996 |

OTHER PUBLICATIONS

International Search Report and Written Opinion for PCT/2017/054520 dated Jun. 28, 2018.

(Continued)

*Primary Examiner* — Emma K Frick
(74) *Attorney, Agent, or Firm* — Hahn Loeser & Parks LLP; Bret A. Hrivnak (57) ABSTRACT

Embodiments of the disclosure include a mud flap for a vehicle having a mounting section and a barrier section. The barrier section is configured to deflect matter discharged from a tire during vehicle operation. The width of the mounting section is greater than the width of the barrier section. The mounting section optionally includes a first set of mounting features, each of the mounting features forming a recess or aperture. One mounting feature of the first set of mounting features is arranged at and/or beyond a widthwise extent of the barrier section width. The one mounting feature is also arranged at least partially within a portion of the mounting section width extending outwardly from a widthwise extent of the barrier section width. Further embodi- (Continued)

ments include mounting a single wide mud flap on a vehicle configured to receive a dual wide mud flap.

15 Claims, 5 Drawing Sheets

(56) References Cited

U.S. PATENT DOCUMENTS

| | | | | |
|---|---|---|---|---|
| 3,582,108 A | | 6/1971 | Carlton | |
| 3,684,312 A | * | 8/1972 | Evans | B62D 25/188 280/851 |
| 3,713,669 A | * | 1/1973 | Evans | B62D 25/188 280/851 |
| 3,776,571 A | * | 12/1973 | Gilles | B62D 25/18 280/851 |
| 3,782,757 A | * | 1/1974 | Juergens | B62D 25/163 280/851 |
| 3,874,697 A | * | 4/1975 | Thompson | B62D 25/188 280/851 |
| 4,007,944 A | * | 2/1977 | Dingess | B62D 25/188 248/289.31 |
| 4,165,092 A | * | 8/1979 | Herlein | B62D 25/188 248/552 |
| 4,627,631 A | | 12/1986 | Sherman | |
| 5,044,667 A | | 9/1991 | Manning | |
| 5,273,318 A | | 12/1993 | Nakayama et al. | |
| 5,366,247 A | | 11/1994 | Fischer | |
| 5,564,750 A | | 10/1996 | Bajorek et al. | |
| 5,833,283 A | * | 11/1998 | Shaw | B62D 25/188 293/121 |
| 6,799,782 B2 | | 10/2004 | Jain et al. | |
| 6,851,717 B1 | | 2/2005 | Anderson | |
| 7,931,302 B2 | * | 4/2011 | Vaughn | B62D 25/186 280/847 |
| 8,287,001 B2 | * | 10/2012 | Uhl | B62D 25/188 280/847 |
| 8,579,314 B2 | * | 11/2013 | Prazen | B62D 25/182 280/154 |
| 8,777,270 B2 | | 7/2014 | Kim et al. | |
| 9,004,538 B2 | | 4/2015 | Eklund et al. | |
| 9,027,983 B2 | * | 5/2015 | Butler | B62D 35/001 280/847 |
| 9,221,390 B1 | | 12/2015 | Begley | |
| 9,284,000 B1 | * | 3/2016 | Smith | B62D 25/188 |
| 10,611,326 B2 | * | 4/2020 | McNeilus | B60R 19/42 |
| 11,155,309 B2 | * | 10/2021 | Morgan | B62D 25/188 |
| 11,172,612 B2 | * | 11/2021 | McGargill | A01B 61/046 |
| 2002/0043797 A1 | | 4/2002 | Cicansky | |
| 2003/0141713 A1 | | 7/2003 | Morin et al. | |
| 2011/0204614 A1 | * | 8/2011 | Cicansky | B62D 25/18 264/138 |
| 2013/0320658 A1 | | 12/2013 | Eklund et al. | |
| 2018/0043945 A1 | | 2/2018 | Wiegel | |

OTHER PUBLICATIONS

International Search Report and Written Opinion for PCT/2018/053761 dated Jan. 15, 2019.
International Search Report and Written Opinion for PCT/2017/054514 dated Jun. 13, 2018.

* cited by examiner

MUD FLAP WITH ADAPTABLE MOUNTING SECTION

BACKGROUND

Field

Embodiments of this disclosure relate generally to mud flaps for use on wheeled vehicles, such as trucks, semi tractors and trailers.

Description of the Related Art

Commonly, semi tractors and trailers employ mounting brackets configured to mount mud flaps behind a pair of tire/wheel assemblies which is often referred to as a dual tire/wheel assembly. Presently, these dual tire/wheel assemblies may optionally be replaced with a single wide tire/wheel assembly. In this case, the single wide tire is wider than each tire employed in the dual tire/wheel assembly but is not wider than the total width of the dual tire/wheel assembly. Therefore, when employing single wide tires, the mud flaps used for dual tire/wheel assemblies ("dual wide" mud flaps) are wider than is needed for a single wide tire. As a result, any aerodynamic benefit of the single wide tire resulting from its reduced width is not fully realized. Because the reduction of drag and other improvements in aerodynamic performance ultimately result in operational cost savings for vehicle operators, such as by way of increased fuel economy, there is a need to substitute mud flaps designed for use with dual tire/wheel assemblies with narrower mud flaps configured to span the width of a single side tire.

One impediment to this substitution is having to mount a single wide tire mud flap to a pre-existing mud flap mounting structure, such as a mounting bracket, which employs a standard or pre-existing hole pattern configured to mount a dual tire mud flap. Often, these pre-existing mounting structures provide four (4) orifices (holes) for receiving fasteners to mount the dual tire mud flaps. A standard spacing of seven (7) inches has been employed for dual wide mud flaps, which are commonly 24 inches wide. Single wide mud flaps are commonly 18 inches wide. It is desirable, however, to use at least three (3) fasteners (meaning, 3 or 4 or more) to mount the mud flap to the mounting structure to ensure a sufficiently strong and durable attachment. It is additionally desirable to mount the single wide mud flap directly behind the single wide tire, such that the outer side edge defining the outer, widthwise extent of the single wide mud flap does not notably extend beyond the single wide tire width, so to minimize any detrimental effect on aerodynamic performance. However, using the existing hole pattern on the mounting structure does not permit accomplishment of these desires. Therefore, there is a need to provide a reduced width mud flap for use with single wide tires that has an adaptable mounting section that is able to be used with pre-existing mounting orifices arranged along a mounting structure on a vehicle otherwise configured for mounting a dual wide mud flap.

SUMMARY

Embodiments of the disclosure include a mud flap for a vehicle, such as for a trailer or a tractor for towing a trailer, for example. The mud flap includes a height, a width, and a thickness. In an intended or actual mounted arrangement on a vehicle, the height extends primarily in a vertical direction, the width extending perpendicular to the height, and the thickness extending perpendicular to both the height and the width. The thickness measures less than both the width and height. The mud flap also includes a mounting section and a barrier section. The mounting section is configured to facilitate mounting of the mud flap to a vehicle adjacent to a tire. The barrier section is configured to intercept and deflect matter discharged from the tire while rotating during vehicle operation. The mounting section has a width and the barrier section has a width, each width of the mounting section and the barrier section extending in the direction of the mud flap width. The width of the mounting section is greater than the width of the barrier section. In certain instances, the mounting section includes a first set of mounting features, each of the mounting features forming a recess or aperture. One mounting feature of the first set of mounting features is arranged at and/or beyond a widthwise extent of the barrier section width. The one mounting feature is also arranged at least partially within a portion of the mounting section width extending outwardly from a widthwise extent of the barrier section width.

Embodiments of the disclosure further include methods for mounting the mud flap to a vehicle. Certain embodiments of such methods include providing a mounting structure configured for receiving a dual wide mud flap, the dual wide mud flap designed to extend across a substantial width of a dual tire/wheel assembly. The dual wide mud flap includes a first set of mounting orifices to facilitate reception of the dual wide mud flap.

Such methods further include providing a single wide mud flap as recited or contemplated in this disclosure, the single wide mud flap being configured to extend across a substantial width of a single wide tire of a single wide tire/wheel assembly. In certain instances, the single wide mud flap includes a first set of mounting features, each mounting feature forming a recess or an aperture where one of the mounting features is arranged at and/or beyond a first set of mounting features. In particular instances, the first set of mounting features has less mounting features than the mounting orifices contained in a first set of mounting orifices arranged along the mounting structure. Such methods further include attaching the single wide mud flap to the mounting structure by extending a fastening member through each mounting feature of the first set of mounting features. The single wide mud flap is installed behind the single wide dual/wheel assembly, where the outer widthwise extent of the barrier section is aligned with the outer, widthwise extent of the single wide tire of the single wide tire/wheel assembly, such that the barrier section of the single wide mud flap does not notably extend outwardly from the widthwise extent of the single wide tire of the single wide tire/wheel assembly on an exterior side of the single wide tire/wheel assembly.

The foregoing and other objects, features, and advantages will be apparent from the following more detailed descriptions of particular embodiments, as illustrated in the accompanying drawings wherein like reference numbers represent like parts of particular embodiments.

DETAILED DESCRIPTION OF THE DRAWINGS

DETAILED DESCRIPTION OF PARTICULAR EMBODIMENTS

This disclosure describes reduced width mud flaps for use with single wide tires having an adaptable mounting section able to be used with pre-existing mounting orifices arranged along a mounting structure on a vehicle, otherwise configured for mounting a dual wide mud flap.

Any such mud flap can be described as having a height, a width, and a thickness. In an intended mounted arrangement on a vehicle, the height extends primarily in a vertical direction, the width extending perpendicular to the height, and the thickness extending perpendicular to both the height and the width. The thickness can be described as being less than each of the height and width, and in particular instances, substantially less than each of the height and width.

The mud flap can also be described as having a mounting section and a barrier section. The barrier section is located below the mounting section in particular instances, in relation to the mud flap height. In other words, the mounting section and the barrier section are arranged at different heights along the height of the mud flap, except that this contemplates that there may be overlap between the sections along the height. It is appreciated that the mounting section may be located at the top of the mud flap or may be offset from the top of the mud flap, where the top of the mud flap connotes the maximum height of the mud flap in an elevational sense. The mounting section is configured to facilitate mounting of the mud flap to a vehicle, and more specifically, adjacent to (that is near or in close proximity to) a tire/wheel assembly, such as when the tire is a single wide tire. The barrier section is configured to intercept and deflect matter discharged from a rotating tire during vehicle operation. Such material may be any material that may be found on a ground surface, such as road debris, stones, and water (taking the form of water spray).

The mounting section has a width and the barrier section has a width, each width of the mounting section and the barrier section extending in the direction of the mud flap width. It is appreciated that the width of the mounting section is greater than the width of the barrier section, such that one or more portions of the mounting section may extend outwardly from a widthwise extent of the barrier section. For example, in certain instances, the mounting section extends outwardly from the barrier section on one side of the barrier section width, while in other instances, the mounting section extends outwardly from the barrier section on opposing sides of the barrier width. It is also appreciated that the widths of each of the mounting and barrier sections may be constant or variable, as each section may take any known shape. In being wider than the barrier section, it is appreciated that the mounting section may extend outwardly from any one or both side edges of the barrier section, the side edges defining the width of the barrier section. The side edges also define the widthwise extent of the barrier section.

The mounting section includes a first set of mounting features, configured to facilitate attachment of the mud flap to a mounting structure on the vehicle by way of a first set of mounting orifices. Any such mounting feature may form a recess (indentation) or aperture to facilitate attachment of the mud flap to the vehicle. An aperture may be configured to receive any desired fastening member, such as a shaft, bolt, or screw, for example. It is appreciated that the aperture may take any desired form. For example, the aperture may form a hole having a circular cross-section or a hole having an elongated cross-section, such as forming an oval or truncated circle (an oval having straight sides), to better permit a more robust ability to align the mud flap on the mounting structure. A recess forms an indentation, such as to indicate where an aperture may be formed for mounting purposes in accordance with a pre-existing pattern for mounting the mud flap to a particular mounting orifice configuration on the vehicle.

It is noted that the one mounting feature of the first set of mounting features is arranged at and/or beyond (outside) a widthwise extent of the barrier section width, where the one mounting feature is arranged at least partially within a portion of the mounting section width extending outwardly from a widthwise extent of the barrier section width. It is appreciated that other mounting features may be arranged at and/or beyond the widthwise extent of the barrier section. When a second set or any additional set of mounting features is included in a mounting section of a single wide mud flap, it is appreciated that one or more mounting features of the second or additional set of mounting features is arranged at and/or beyond a widthwise extent of the barrier section width, and where any such mounting feature is arranged at least partially within a portion of the mounting section width extending outwardly from a widthwise extent of the barrier section width, each any such mounting feature may be arranged on the same or different side of the mounting section relative to the one from the first set across the mounting section width. For example, in certain instances when a first and second set of mounting features are arranged in a mounting section, with regard to the mounting features arranged at and/or beyond the widthwise extent of the barrier section width, one mounting feature of the first set is arranged on one side of the mounting section while one mounting feature of the second set is arranged on an opposing side of the mounting section, each being arranged in a portion of the mounting section extending outwardly from a widthwise extent of the barrier section. Any portion of the mounting section extending outwardly from the widthwise extent of the barrier section may be referred to as a wing. Each such portion may partially or fully include one of the mounting features from any one or more sets of mounting features. It is appreciated that any wing portion, if not in use for mounting the mud flap to the vehicle, may be removed, such as when helpful to improve aerodynamic performance. Likewise, each wing may form any shape, such as being rounded (contoured), triangular, or rectangular, while in certain instances may be minimized in size and profile to minimize any harm to aerodynamic performance. For example, to minimize the wing profile, a rounded wing may be employed, where an outer extent of the wing concentrically extends about a mounting feature arranged in the wing. In certain instances, for example, the width of the wing (that is, the portion of the mounting section width extending outwardly from a side of the barrier section width) may extend outwardly from the side of the barrier width in the direction of the mounting section width by a distance of 0.75 inches to 1.5 inches, and in more specific instances, by a distance of 1 inch. This may occur, for instance, when a pair of wings are provided on opposing sides of the mounting section width. In other instances, it is appreciated that the distance may be greater than 1.5 inches, such as when only one wing is provided or when additional mounting features are to be provided in any wing. Optionally, one or more recesses (indentations) may be arranged along each wing to facilitate improved removal of the wing from the mud flap.

In particular instances, the first set of mounting features is configured to match a set (pattern) of mounting orifices arranged on the vehicle or along a mounting structure arranged on, or for arrangement on, the vehicle. In certain instances, the first set of mounting features forms a quantity of mounting features less than a quantity of mounting orifices contained in a set of mounting orifices arranged along a mounting structure for or on the vehicle. When one or more additional sets of mounting features are arranged along the mounting section of the mud flap, each such additional set of mounting features may be configured to match a different set (pattern) of mounting orifices arranged on the vehicle or along a mounting structure arranged on, or for arrangement on, the vehicle. These different sets may or may not share certain mounting orifices. By including different sets of mounting features, the mud flap may be mounted using any one of different mounting orifice arrangements (patterns) as may be provided on the structure to which is to be attached. Additionally, the use of different sets of mounting features permits mounting of the mud flap on different sides of a vehicle, at different tire/wheel assembly locations on any vehicle, and/or in different forward or backwards arrangements. For example, a mud flap may be designed to be only used in a forward arrangement (which is referred to as a directional mud flap), while others may be capable of being flipped backwards and installed in either a forward or backwards arrangement (which is referred to as a non-directional mud flap).

In operation, when using a single wide tire/wheel assembly on a vehicle with a mounting structure configured to receive a dual wide mud flap, that is, a mud flap configured to be used with a dual tire/wheel assembly, any single wide mud flap disclosed or contemplated herein is installed on this mounting structure. In installing (mounting) the single wide mud flap, while the mud flap is to be installed behind the single wide dual/wheel assembly, it is desirous to substantially align the outer side edge (the outer widthwise extent) of the barrier section with the outer, widthwise extent of the single wide tire of the single wide tire/wheel assembly, such that the barrier section of the single wide mud flap does not notably extend outwardly from the widthwise extent of the single wide tire/wheel assembly on an exterior side thereof, which can also be described as not substantially protruding in an axial direction of the axle from a side of the single wide tire/wheel assembly opposite a centerline of the axle or vehicle. This set of mounting features may form the only set of mounting features arranged within the mounting section or one of a plurality of sets of mounting features arranged within the mounting section. In installing the single wide mud flap on the mounting structure having a set of mounting orifices configured to mount a dual wide mud flap, a set of mounting features arranged along the mounting section of the single wide mud flap are selected for use to facilitate the alignment desired between the outer widthwise extents of the single wide mud flap barrier section and of the single wide tire/wheel assembly. The plurality of sets of mounting features includes the first set and at least a second set of mounting features. The mounting features for any set may form an aperture or a recess (indentation) or any combination of thereof. As mentioned previously, each mounting feature is provided to facilitate use of fastening members, such as bolts and screws, for example.

Certain exemplary embodiments are discussed below in association with the figures.

Figure 1:
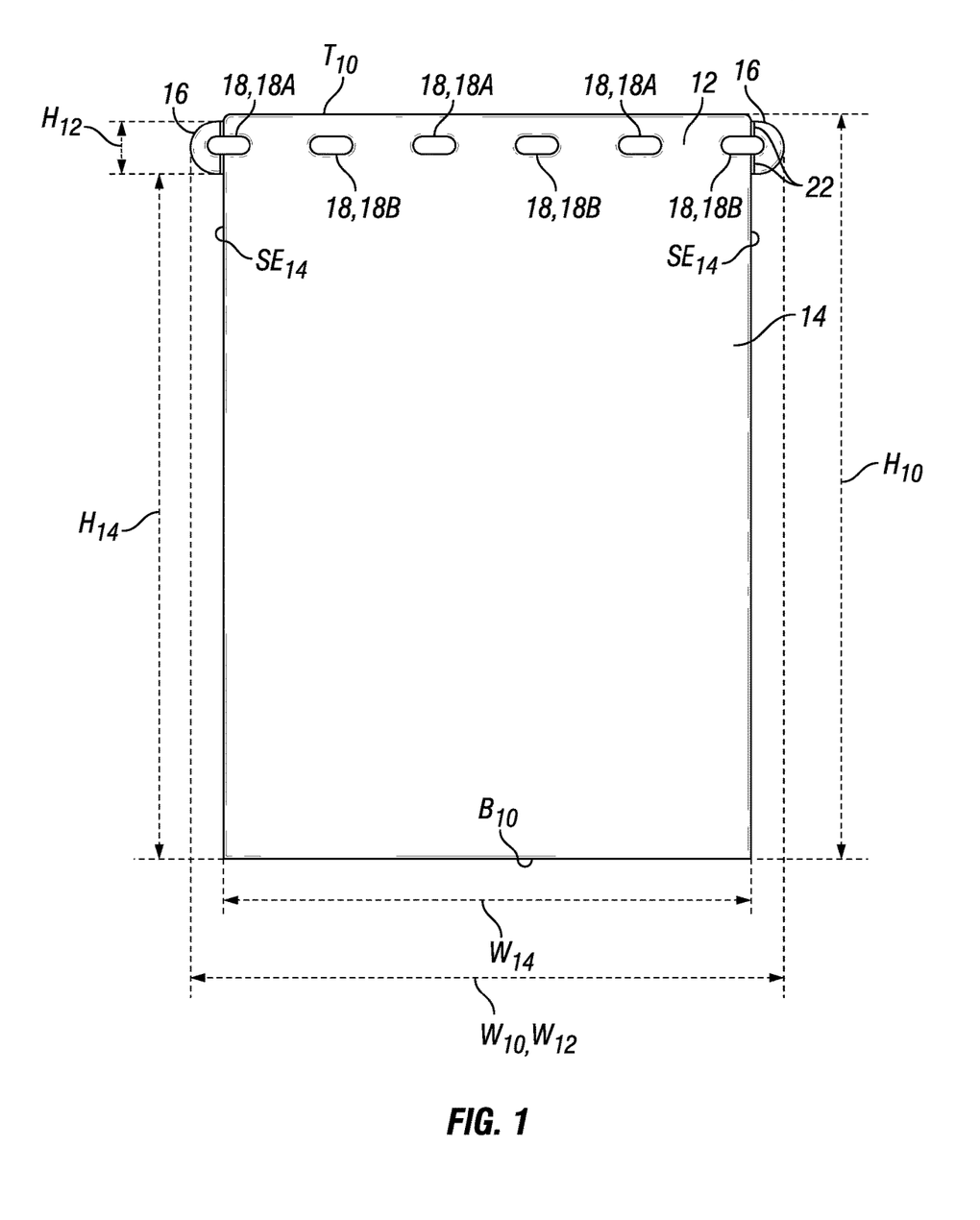
FIG. 1 is a front view of a mud flap having two sets of mounting features in accordance with an embodiment of the disclosure.

With reference to FIG. 1, a mud flap in accordance with an exemplary embodiment is shown. In particular, the mud flap 10 has a height $H_{10}$, a width $W_{10}$, and a thickness (not shown, but the thickness extends into the page perpendicular to both the height $H_{10}$ and width $W_{10}$). The thickness can be described as being less than each of the height and width, and in particular instances, substantially less than each of the height and width.

Mud flap 10 of FIG. 1 also includes a mounting section 12 and a barrier section 14. Barrier section 14 is located below mounting section 12 in relation to the mud flap height $H_{10}$. In other words, mounting section 12 and the barrier section 14 are arranged at different heights $H_{12}$, $H_{14}$ along the height $H_{10}$ of mud flap 10. Mounting section 12 is located near the top $T_{10}$ of the mud flap, where the top $T_{10}$ connotes the maximum height of the mud flap in an elevational sense opposite bottom $B_{10}$. Mounting section 12 is configured to facilitate mounting of mud flap 10 to a vehicle, while barrier section 14 is configured to intercept and deflect matter discharged from a rotating tire during vehicle operation, such as, for example, road debris, stones, and water. Mounting section 12 has a width $W_{12}$ and barrier section 14 has a width $W_{14}$, each width $W_{12}$, $W_{14}$ extending in the direction of the mud flap width $W_{10}$. Mounting section width $W_{12}$ is greater than barrier section width $W_{14}$, such that two portions 16 extend outwardly from the widthwise extent $SE_{14}$ of the barrier section 14 on opposing sides of mounting section 12. Barrier section width $W_{14}$ is shown to be constant, but may be variable in other instances. It is also noted that barrier section 14 is rectangular in shape, but in other instances may form any other known shape. In being wider than barrier section 14, mounting section extends outwardly from both side edges $SE_{14}$ of barrier section 14, side edges $SE_{14}$ defining the width $W_{14}$ of barrier section 14.

Figure 5:
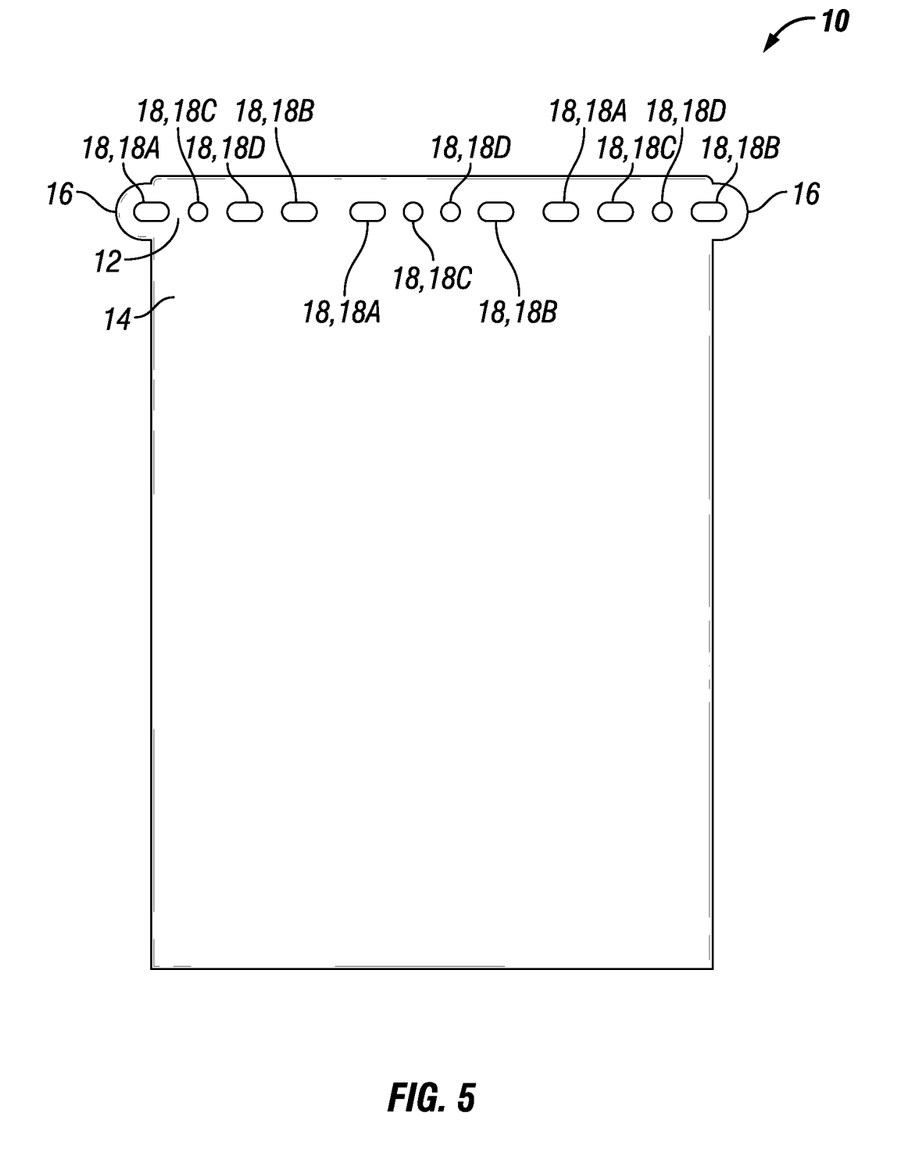
FIG. 5 is a front view of a mud flap having additional sets of mounting features in accordance with another embodiment of the disclosure.

With continued reference to FIG. 1, mounting section 12 includes a first set 18A of mounting features 18, configured to facilitate attachment of the mud flap to a mounting structure on a vehicle by way of a first set of mounting orifices, where any mounting feature may form a recess or aperture. Additionally, in an optional arrangement, the exemplary embodiment shown includes a second set 18B of mounting features 18, configured to facilitate attachment of the mud flap to a mounting structure on a vehicle by way of a second set of mounting orifices, where any mounting feature may form a recess or aperture. It is further shown that one mounting feature 18 of the first set 18A is arranged on one side of mounting section 12 while one mounting feature 18 of the second set 18B is arranged on an opposing side of mounting section 12, each one mounting feature 18 being arranged in a portion 16 of mounting section 12 extending outwardly from a widthwise extent of the barrier section 14, this portion 16 being referred to as a wing. In yet other variations, even more sets of mounting features 18 may be included. For example, with reference to FIG. 5, a third set 18C and a fourth set 18D of mounting features 18 are included with the first set 18A and the second set 18B. By including different sets of mounting features 18, the mud flap 10 may be mounted using any one of different mounting orifice arrangements (patterns) as may be provided on the structure to which is to be attached. Additionally, the use of different sets of mounting features permits mounting of the mud flap 10 on different sides of a vehicle, at different tire/wheel assembly locations on any vehicle, and/or in different forward or backwards arrangements. For example, a mud flap 10 may be designed to be only used in a forward arrangement (which is referred to as a directional mud flap 10), while others may be capable of being flipped backwards and installed in either a forward or backwards arrangement (which is referred to as a non-directional mud flap 10).

In the exemplary embodiment shown in FIG. 1, one mounting feature 18 of the first set 18A of mounting features 18 is arranged at and beyond (that is, outside) a widthwise extent of the barrier section width $W_{14}$, as designated by side edge $SE_{14}$. By doing so, the one mounting feature 18 is arranged partially within a portion of the mounting section width $W_{12}$ extending outwardly from a widthwise extent $SE_{14}$ of the barrier section width $W_{14}$. The portions of the mounting section 12 extending outwardly from the widthwise extent $SE_{14}$ of the barrier section 14 are each identified as a wing 16. Optionally, each wing 16 includes elongated recesses 22 to facilitate the removal of the corresponding wing 16 should the mounting feature 18 arranged therein not be used when mounting the mud flap 10 to a vehicle, such as when it is helpful to improve aerodynamic performance.

Figure 2:
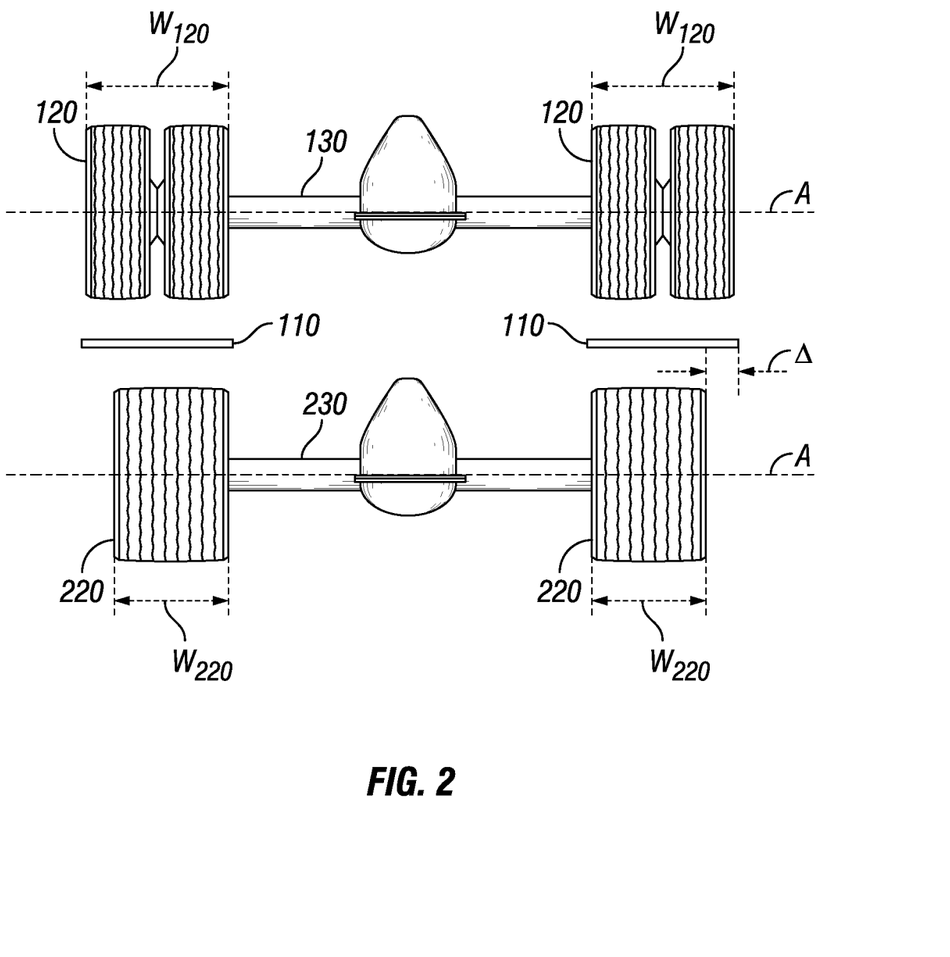
FIG. 2 is a top view of an exemplary axle having a pair of dual wheels rotatably attached thereto shown in combination with a pair of mud flaps operably attached to the vehicle, the figure also including an alternative axle including a pair of single, extra-wide tires in substitute for each pair of dual wheels.

With reference now to FIG. 2, on a particular vehicle, a dual wide mud flap 110 is shown arranged behind each of a pair of dual tire/wheel assemblies 120 arranged at opposing ends of an axle 130. As can be seen, the width of each dual wide mud flap 110 extends the full width $W_{120}$ of each dual tire/wheel assembly 120. For comparison purposes, a commensurate axle 230 is shown having single wide tire/wheel assemblies 220 mounted thereon in lieu of dual tire/wheel assemblies 120. Axles 130 and 230 are aligned laterally to show a difference Δ in width between a dual wide mud flap 110 and the width $W_{220}$ of each single wide tire/wheel assembly 220. Clearly, there is a need for a reduced width mud flap, that is, a single wide mud flap, for the purpose of minimizing any reduction in aerodynamic performance when used with a single wide tire/wheel assembly, where otherwise the mud flap 110 would protrude outwardly from the exterior side of the single wide tire/wheel assembly 220.

Figure 3:
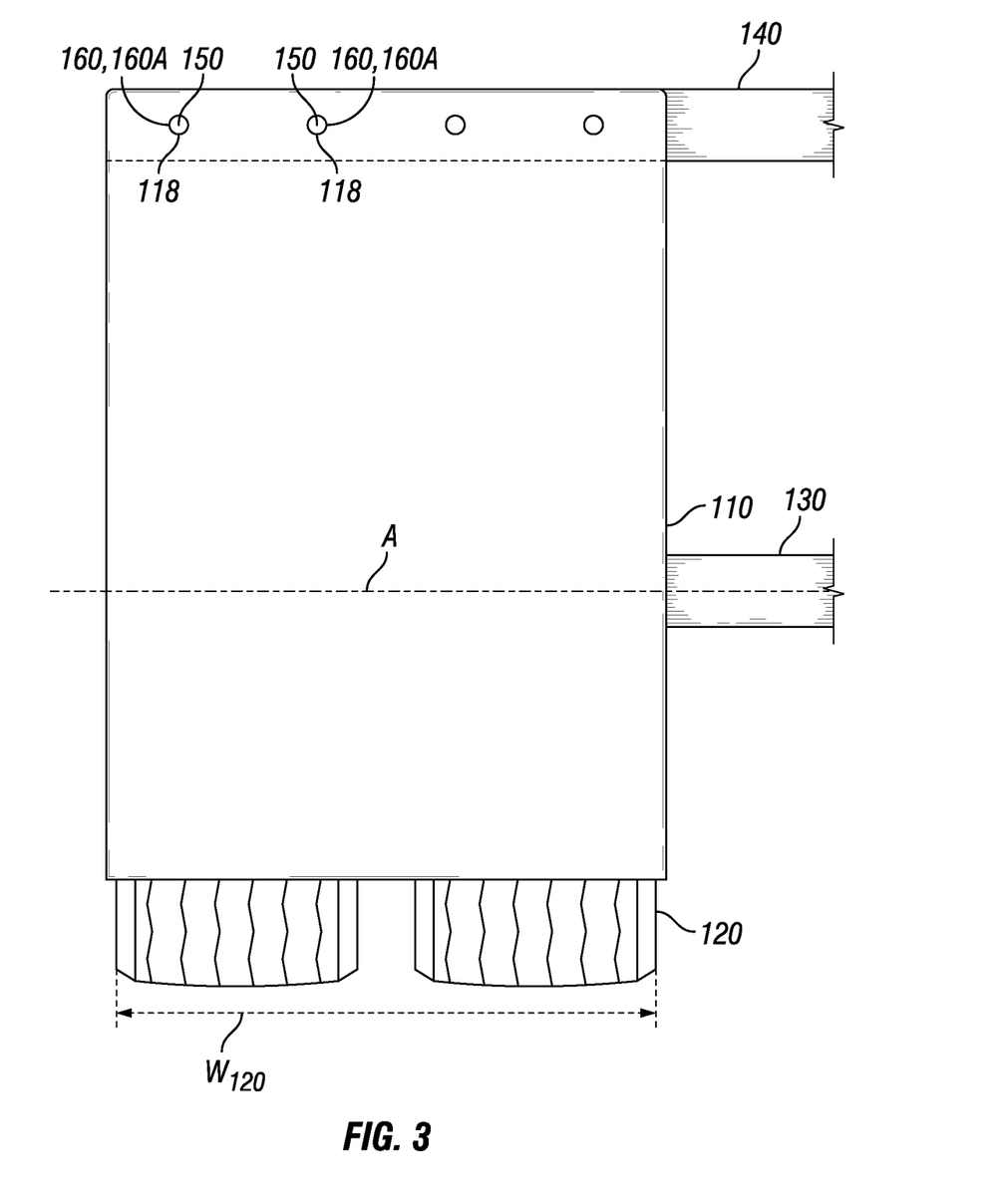
FIG. 3 is a front view of a mud flap attached to a mounting structure forming a bracket on a vehicle as may be known in the prior art.
Figure 4:
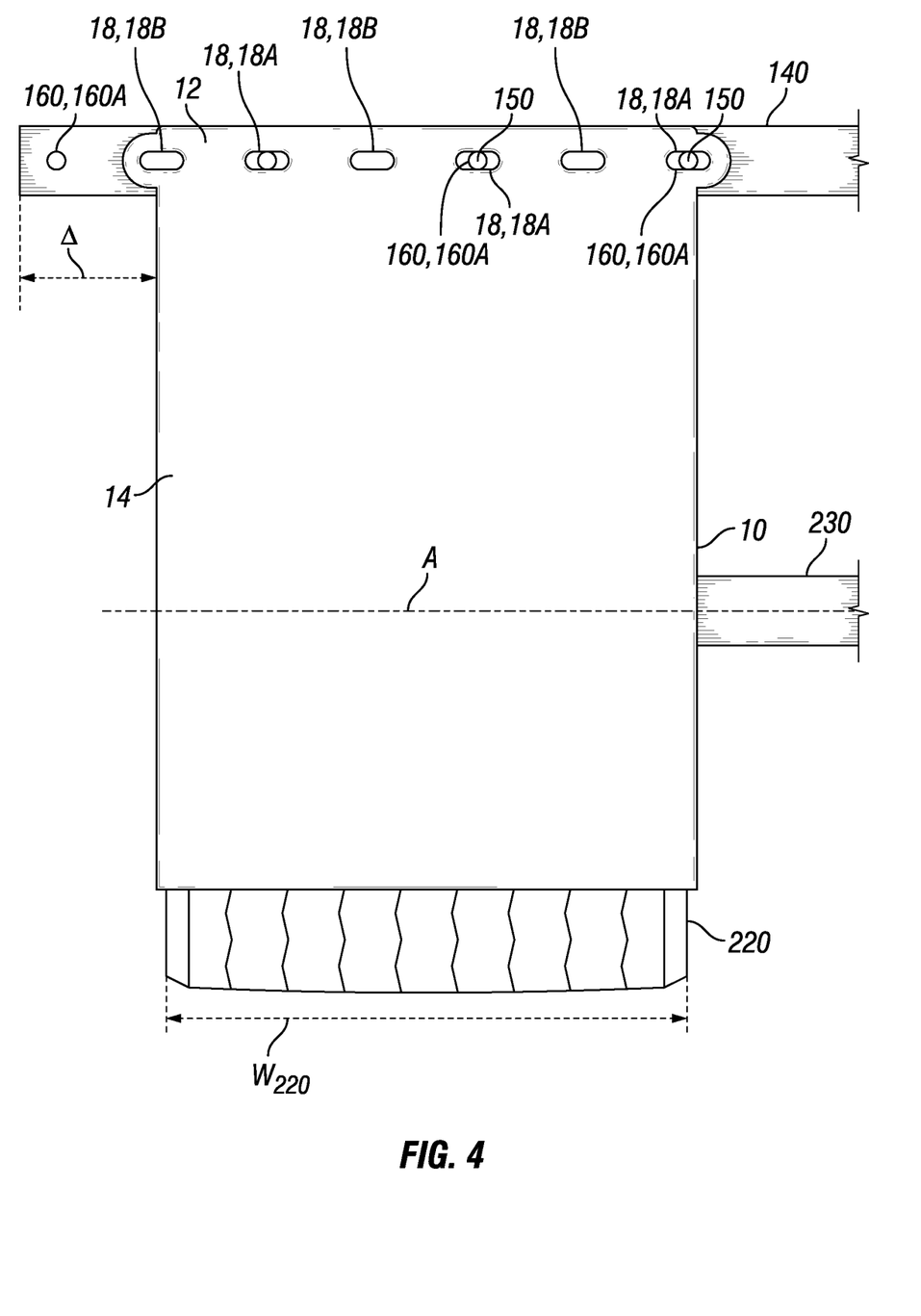
FIG. 4 is a front view of a mud flap attached to a mounting structure forming a bracket on a vehicle in accordance with an embodiment of the disclosure.

With reference now to FIG. 3, a dual wide mud flap 110 is more closely shown mounted to a mounting bracket 140 on a vehicle, the mud flap 110 arranged behind a dual tire/wheel assembly 120. The dual wide mud flap 110 includes mounting apertures 118 and is affixed to mounting bracket 140 using fastening members 150 each of which extend through a mounting aperture 118 and into a mounting orifice 160 arranged in a particular arrangement along mounting bracket 140, the mounting orifices 160 forming a set 160A of mounting orifices 160. In FIG. 4, a single wide mud flap 10 is shown mounted to the same mounting bracket 140 used with the dual tire/wheel assembly 120 in FIG. 3, the single wide mud flap 10 arranged behind a single wide tire/wheel assembly 220. As with the dual wide mud flap 110, the single wide mud flap 10 is affixed to mounting bracket 140 using fastening members 150 each of which extend through a set 160A of mounting orifices 160 arranged in a particular arrangement along mounting bracket 140. It is noted that the first set 18A of mounting features 18 forms a quantity of mounting features less than the quantity of mounting orifices 160 contained the set 160A of mounting orifices 160 arranged along the mounting structure 140. The difference in width Δ is shown between single wide mud flap 10 and dual wide mud flap 110, as also shown in FIG. 2 and which also represents the difference in width between single wide tire of the single tire/wheel assembly 220 and dual tire/wheel assembly 120. It is stressed that the single wide mud flap 10 shown in FIG. 3 is installed on a mounting structure 140 configured to mount a dual wide mud flap (see 110 in FIGS. 2 and 3). FIG. 3 also shows the outer side edge $SE_{14}$ (the outer widthwise extent) of the single wide mud flap barrier section 14 substantially aligned with the outer, widthwise extent of the single wide tire of the single wide tire/wheel assembly 220, where the barrier section 14 of the single wide mud flap 10 does not notably extend outwardly from the widthwise extent of the single wide tire of the single wide tire/wheel assembly 220 on an exterior side thereof. The barrier section 14 can also be described as not substantially protruding in an axial direction A of the axle 230 from a side of the single wide tire of the single wide tire/wheel assembly 220 opposite a widthwise centerline of the axle or vehicle. In installing the single wide mud flap 10 on the mounting structure having a set 160A of mounting orifices 160 configured to mount a dual wide mud flap, a set 18A of mounting features 18 arranged along the mounting section 12 of the single wide mud flap 10 are selected for use that which facilitate the alignment desired between the outer, widthwise extents $SE_{14}$ of the single wide mud flap barrier section 14 and the single wide tire of the single wide tire/wheel assembly 220. This set of mounting features is one of two sets 18A, 18B of mounting features 18 arranged within mounting section 12.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A mud flap for a vehicle comprising:
   a height, a width, and a thickness, where in an intended mounted arrangement on a vehicle the height extends primarily in a vertical direction, the width extending perpendicular to the height, and the thickness extending perpendicular to both the height and the width and measuring less than both the width and height;
   a mounting section and a barrier section each being integral with each other, the mounting section configured to facilitate mounting of the mud flap to the vehicle adjacent a tire and the barrier section configured to intercept and deflect matter discharged from the tire while rotating during vehicle operation;

the mounting section having a width and the barrier section having a width, each width of the mounting section and the barrier section extending in the direction of the mud flap width, where the width of the mounting section is greater than the width of the barrier section;

the mounting section including a first set of mounting features, each of the mounting features forming a recess or aperture, where one mounting feature of the first set of mounting features is arranged at and/or beyond a widthwise extent of the barrier section width, and where the one mounting feature is arranged at least partially within a portion of the mounting section width extending outwardly from a widthwise extent of the barrier section width, where the first set of mounting features are configured to facilitate attachment of the mud flap to a mounting structure on the vehicle by way of a first set of mounting orifices; and, the mounting section further including a second set of mounting features configured to facilitate attachment of the mud flap to the mounting structure or to another mounting structure on the vehicle by way of a second set of mounting orifices, where the first set of mounting orifices and the second set of mounting orifices each comprise a different arrangement of mounting orifices configured to place the mud flap in a different mounting arrangement.

2. The mud flap of claim 1, where the mounting section and the barrier section are arranged at different heights along the height of the mud flap.

3. The mud flap of claim 2, where the barrier section is located below the mounting section relative to the mud flap height.

4. The mud flap of claim 1, where one mounting feature of the second set of mounting features is arranged at and/or beyond a widthwise extent of the barrier portion width, and where the one mounting feature is arranged at least partially within a portion of the mounting portion width extending outwardly from a widthwise extent of the barrier portion width.

5. The mud flap of claim 4, where each one mounting feature of the first and second set of mounting features arranged at least partially within a portion of the mounting portion width extending outwardly from a widthwise extent of the barrier portion width are arranged on opposing sides of the mounting section relative to the mounting section width.

6. The mud flap of claim 1, where the first set of mounting features in quantity are less than a quantity of mounting orifices arranged along the mounting structure configured to mount a dual wide mud flap, the dual wide mud flap being wider than the mud flap.

7. The mud flap of claim 1, where the second set of mounting features in quantity are less than a quantity of mounting orifices arranged along the mounting structure configured to mount a dual wide mud flap, the dual wide mud flap being wider than the mud flap.

8. The mud flap of claim 1, where the mounting section width extends outwardly from the widthwise extent of the barrier section from one side of the barrier section width.

9. The mud flap of claim 1, where the mud flap includes one or more recesses arranged along or adjacent to a portion of the mounting section extending outwardly from the widthwise extent of the barrier section, the one or more recesses being configured to facilitate removal of the portion from the mud flap.

10. The mud flap of claim 1, where in being integral, the mounting section and a barrier section are each unitary with each other.

11. A mud flap for a vehicle comprising:

a height, a width, and a thickness, where in an intended mounted arrangement on a vehicle the height extends primarily in a vertical direction, the width extending perpendicular to the height, and the thickness extending perpendicular to both the height and the width and measuring less than both the width and height;

a mounting section and a barrier section each being integral with each other, the mounting section configured to facilitate mounting of the mud flap to a vehicle adjacent a tire and the barrier section configured to intercept and deflect matter discharged from the tire while rotating during vehicle operation;

the mounting section having a width and the barrier section having a width, each width of the mounting section and the barrier section extending in the direction of the mud flap width, where the width of the mounting section is greater than the width of the barrier section;

the mounting section including a first set of mounting features, each of the mounting features forming a recess or aperture, where one mounting feature of the first set of mounting features is arranged at and/or beyond a widthwise extent of the barrier section width, and where the one mounting feature is arranged at least partially within a portion of the mounting section width extending outwardly from a widthwise extent of the barrier section width, where the first set of mounting features are configured to facilitate attachment of the mud flap to a mounting structure on the vehicle by way of a first set of mounting orifices; and, the mounting section further including a second set of mounting features configured to facilitate attachment of the mud flap to the mounting structure or to another mounting structure on the vehicle by way of a second set of mounting orifices, where the mounting section width extends outwardly from the widthwise extent of the barrier section from opposing sides of the barrier section width.

12. A method of mounting a mud flap on a vehicle comprising:

providing a mounting structure configured for receiving a dual wide mud flap configured to extend across a substantial width of a dual tire arrangement, the dual wide mud flap including a first set of mounting orifices to facilitate reception of the dual wide mud flap, where the dual tire arrangement comprises a pair of tires arranged adjacent one another on a vehicle;

providing a mud flap comprising:

a height, a width, and a thickness, where in an intended mounted arrangement on the vehicle the height extends primarily in a vertical direction, the width extending perpendicular to the height, and the thickness extending perpendicular to both the height and the width and measuring less than both the width and height;

a mounting section and a barrier section each being integral with each other, the mounting section configured to facilitate mounting of the mud flap to the vehicle adjacent a tire and the barrier section configured to intercept and deflect matter discharged from the tire while rotating during vehicle operation;

the mounting section having a width and the barrier section having a width, each width of the mounting section and the barrier section extending in the direction of the mud flap width, where the width of the mounting section is greater than the width of the barrier section;

the mounting section including a first set of mounting features, each of the mounting features forming a recess or aperture, where one mounting feature of the first set of mounting features is arranged at and/or beyond a widthwise extent of the bather section width, and where the one mounting feature is arranged at least partially within a portion of the mounting section width extending outwardly from a widthwise extent of the barrier section width, where the first set of mounting features are configured to facilitate attachment of the mud flap to a mounting structure on the vehicle by way of a first set of mounting orifices; and, the mounting section further including a second set of mounting features configured to facilitate attachment of the mud flap to the mounting structure or to another mounting structure on the vehicle by way of a second set of mounting orifices, the mud flap being a single wide mud flap configured to extend across a substantial width of a single wide tire, the single wide mud flap including the first set of mounting features, each mounting feature of the first set of mounting features forming the recess or the aperture, the first set of mounting features in quantity being less than the first set of mounting orifices arranged along the mounting structure;

attaching the single wide mud flap to the mounting structure by extending a fastening member through each mounting feature of the first set of mounting features, where the single wide mud flap is installed behind the single wide tire installed on the vehicle, where the outer widthwise extent of the barrier section is aligned with the outer, widthwise extent of the single wide tire, such that the barrier section of the single wide mud flap does not substantially extend outwardly from the widthwise extent of the single wide tire on an exterior side of the single wide tire installed on the vehicle.

13. The method of claim 12, where prior to attaching the single wide mud flap, the first set of mounting features arranged along the mounting section of the single wide mud flap is selected for use from a plurality of sets of mounting features arranged along the mounting section to facilitate the alignment between the outer widthwise extent of the single wide mud flap and the single wide tire, the plurality of sets at least including the first set of mounting features and the second set of mounting features is arranged in the single wide mud flap.

14. The method of claim 12, where the mounting structure forms a mounting bracket.

15. The method of claim 12, where, with regard to the mud flap, in being integral, the mounting section and a barrier section are each unitary with each other.

\* \* \* \* \*

UNITED STATES PATENT AND TRADEMARK OFFICE
CERTIFICATE OF CORRECTION

PATENT NO. : 11,958,538 B2
APPLICATION NO. : 16/651993
DATED : April 16, 2024
INVENTOR(S) : Justin Morgan et al.

Page 1 of 1

It is certified that error appears in the above-identified patent and that said Letters Patent is hereby corrected as shown below:

In the Claims

Claim 12, Column 11, Line 13 the word "bather" should be replaced with "barrier"

Signed and Sealed this
Twenty-first Day of May, 2024

Katherine Kelly Vidal
Director of the United States Patent and Trademark Office